(12) United States Patent
Trouilhet

(10) Patent No.: US 6,811,844 B2
(45) Date of Patent: Nov. 2, 2004

(54) MULTILAYER FILM

(75) Inventor: Yves M. Trouilhet, Vesenaz (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/323,538

(22) Filed: Dec. 19, 2002

(65) Prior Publication Data

US 2003/0186047 A1 Oct. 2, 2003

Related U.S. Application Data

(60) Provisional application No. 60/343,500, filed on Dec. 21, 2001.

(51) Int. Cl.$^7$ .................................................. B32B 1/02
(52) U.S. Cl. .................. 428/34.2; 428/34.3; 428/475.8; 428/476.1
(58) Field of Search ............................... 428/34.2, 34.3, 428/475.8, 476.1, 35.7, 35.6, 479.3

(56) References Cited

U.S. PATENT DOCUMENTS

| | | | |
|---|---|---|---|
| 5,087,677 A | * | 2/1992 | Brekner et al. |
| 5,371,158 A | * | 12/1994 | Brekner et al. |
| 5,869,586 A | * | 2/1999 | Riedel et al. |
| 6,068,936 A | * | 5/2000 | Peiffer et al. |
| 6,316,560 B1 | * | 11/2001 | Jacobs et al. |
| 2002/0022096 A1 | | 2/2002 | Curtis |

FOREIGN PATENT DOCUMENTS

| | | | |
|---|---|---|---|
| DD | 109225 | * | 10/1974 |
| EP | 0 381 922 A1 | | 8/1990 |
| EP | 407870 | * | 1/1991 |
| EP | 485893 | * | 5/1992 |
| EP | 0520767 | * | 12/1998 |
| WO | WO 88/03475 | | 5/1988 |
| WO | WO 98/27126 | * | 6/1998 |
| WO | WO 99/12735 | | 3/1999 |

OTHER PUBLICATIONS

Int'l Search Rtp. PCT/US02/40734, prepared Mar. 17, 2003.

* cited by examiner

Primary Examiner—Sandra M. Nolan

(57) ABSTRACT

The invention relates to a multilayer packaging comprising at least one cellulosic fibrous material substrate, and at least one polymeric film coated on the cellulosic substrate, where the polymeric film is made of at least one barrier layer comprising an olefin polymer, and at least one sealant layer comprising an amorphous polyamide, the sealant layer being a layer positioned so that it may contact the packaged product.

14 Claims, No Drawings

MULTILAYER FILM

This application claims the benefit of U.S. Provisional Application No. 60/343,500, filed Dec. 21, 2001.

FIELD OF INVENTION

The present invention relates to an invisible, sealable, environmentally friendly, multilayer packaging material that acts as a good barrier to oxygen and moisture.

BACKGROUND OF THE INVENTION

In the packaging industry, it is conventional to package products in a cardboard or a paper box. For some applications, cardboard or paper may be preferred to plastic for their rigidity for instance. They are also good support for printing and they are easy to recycle. Cardboard and paper are perfect when the packaged item is inert vis-à-vis the outside environment. But they usually do not act as barriers against oxygen, water vapor, odors or any other gases or liquids.

To avoid undesired conditions such as odors, gases or liquids passing from the packaged item to the outside and vice-versa, when the packaged item is food for instance, the cardboard packaging is usually covered by a polymeric plastic film or has a separate polymeric film sealed around the contents and inserted into the cardboard packaging. This plastic film (for example, polyvinylidene chloride) acts as a barrier against these substances. This tends to increase the number of packaging items used.

Nowadays, people are increasingly concerned about the environment and desire to take steps to preserve it for the future. Some governments have taken measures against the accumulation of packaging materials in landfills. In particular, using recyclable raw materials is strongly recommended whereas using non-recyclable polymeric substances is discouraged. Consumers are also encouraged to sort out the recyclable materials from the non-recyclable ones each time that they wish to dispose of used packaging materials in their everyday life. These operations require time and effort and new packaging products that are easier to sort out and to recycle are desired.

In order to have simple and less polluting packaging products, it would be desirable to combine into a single item both the cardboard and plastic film such as described above. A single piece package would be easy to remove, easy to transport and easy to recycle.

Also, because cardboard is naturally easier to recycle than polymeric substances, it would be desired to provide a combined packaging product having such a little percentage of polymers that it could still be considered, at least for some governmental recycling regulations, as a "plain" cardboard item and could therefore undergo the normal process stream for recycling of cardboard alone. At the same time, the barrier properties of the packaging, as well as its classical properties, like sealability, resistance, should be preserved.

In general, packaging films comprise a sealant layer which is sealed on itself, in order to ensure a safe closing of the packaging. The sealant layer is the topmost layer of the film and is usually in direct contact with the packaged item. In this view, the seal must possess a mechanical resistance sufficient to maintain the tight-seal properties during storage and transport.

In the case of food packaging in particular, it is important that the packaged food retain the integrity of its taste and odor during storage. To do this, the sealant layer should have good organoleptic properties and should not capture the food specific taste and odor. It is also very important that the taste and odor of the food are not altered, either by addition or by scalping, by the sealant layer. In addition, it is important that the packaging film has good barrier properties against oxygen and moisture or water vapor to preserve the goods over a long period of time.

EP 0 520 767 discloses a laminate material comprising an amorphous nylon layer applied to the inner surface of a paperboard substrate and a polyolefin layer in contact with the product. These kinds of materials are still not satisfactory as regards the preservation of the taste and odor of the packaged food and as regards sealability.

Therefore, there is still a need for a board-based packaging that would be effective as a barrier against oxygen and water vapor, that would preserve the taste and odor of the packaged item, that would be heat sealable and that could nevertheless be considered as a "plain" board item for recycling purposes.

SUMMARY OF THE INVENTION

Now, it has been surprisingly found that it is possible to co-extrude a particularly thin (preferably about 5 to about 100 microns and more preferably about 10 to about 30 microns) polymeric film having good barrier properties and to coat it onto a board or paper substrate in order to produce a board- or paper-based packaging product having good barrier properties against oxygen and water vapor and that could also be considered as a mono-material-based packaging for recycling purposes.

An aspect of the invention is a multilayer packaging comprising:
  a) at least one cellulosic fibrous material substrate such as cardboard or paper, and
  b) at least one polymeric film coated on the substrate of a), the polymeric film comprising:
    i) at least one barrier layer comprising an olefin polymer, and
    ii) at least one sealant layer comprising an amorphous polyamide, the sealant layer being in contact with the packaged product.

Although the packaging of the invention comprises only a little amount of polymers, it still has excellent barrier properties to oxygen and water vapor. Because of the specific nature of the sealant layer, the packaging has a good sealability on itself, which is important to maintain the packaging integrity, and it also shows good organoleptic properties. Food packaged in the package of the present invention does not lose its taste nor its pleasant odor. The film of the invention has no influence on the taste and odor of the packaged food. The packaging of the invention is environment friendly. Because of its low amount of polymers, it can be considered as "polymer-free" according to the environment regulations standards of many countries and is easily recyclable. It is also easy and inexpensive to produce.

Moreover, because of the nature of the various polymers used in the packaging of the invention, the polymeric film is transparent. As such it is invisible to the customer, thus providing a packaging material that has the appearance of board or paper as if there was no polymeric film at all on the board or paper.

The packaging of the invention also shows a good perforation resistance, a good stiffness and a nice gloss. Moreover, thanks to the low coefficient of friction of the film, it is possible to work it at high speed in a packaging machine.

The packaging of the invention can find use in food packagings. It can find use in the packaging of solid food like chocolates, biscuits, and also in liquid food like fruit juices, beverages, soups, oils, water, alcohols.

DETAILED DESCRIPTION OF THE INVENTION

The packaging of the invention comprises a least one substrate comprised of cellulosic fibrous material. Preferably, the cellulosic fibrous material includes board and/or paper. The grammage of the cellulosic fibrous material substrate preferably ranges from about 30 grams/square meter (g/m$^2$) to about 500 g/m$^2$, and more preferably from about 100 g/m$^2$ to about 300 g/m$^2$.

The cellulosic fibrous material substrate can be flame or corona treated.

The polymeric film of the packaging of the invention is coated on the substrate. It comprises at least one barrier layer comprising an olefin polymer. Olefin polymers include ethylene homopolymers, propylene homopolymers, copolymers of ethylene and propylene, cycloolefin polymers and mixtures thereof. Preferably, the ethylene monomer is present in the copolymer of ethylene and propylene in an amount ranging from about 2 to about 8 weight %, relative to the weight of the copolymer.

In a preferred embodiment of the invention, the olefin polymer of the barrier layer is a cycloolefin polymer. Suitable cycloolefin polymers for the invention have a mean molecular weight Mw (weight average) in the range from 200 to 100,000. They are substantially amorphous, that is they have a crystallinity of less than 5% by weight. They preferably show a glass transition temperature Tg, which is generally in the range from 0 to 300° C. The polydispersity Mw/Mn of the cycloolefin polymers is preferably from 1 to 5.

Cycloolefin polymers (COPs) are homopolymers built up from only one type of cycloolefins or copolymers built up from cycloolefins and comonomers (COCs), where the comonomer content is at most 20% by weight, based on the weight of the cycloolefin polymer. Cycloolefins are mono- or poly-unsaturated polycyclic ring systems, such as cycloalkenes, bicycloalkenes, tricycloalkenes or tetracycloalkenes. The ring systems can be monosubstituted or polysubstituted. Preference is given to the cycloolefins which are built up from monoalkylated or unsubstituted cycloolefins. Particularly preferred cycloolefin homopolymers are polynorbornene, polydimethyloctahydronaphthalene, polycyclopentene and poly(5-methyl)norbornene. The cycloolefin polymers can also be branched. Products of this type can have comb or star structures.

If desired, the above-described cycloolefins can also be copolymerized with comonomers. In a preferred embodiment of the invention, these cycloolefin copolymers (COCs) contain up to 20% by weight, preferably 1–15% by weight, in particular 1–8% by weight, based on the weight of the COC, of comonomer. Preferred comonomers, are olefins having 2 to 6 carbon atoms, in particular ethylene and butylene.

Preferred cycloolefin polymers of the invention are ethylene-norbornene copolymers.

The cycloolefin polymers can be prepared with the aid of transition-metal catalysts. Preparation processes are described, for example, in DD-A-109 225, EP-A-0 407 870, EP-A-0 485 893 and U.S. Pat. No. 5,869,586, U.S. Pat. No. 6,068,936 and WO98/27126 which are incorporated herein by way of reference. Molecular weight regulation during the preparation can advantageously be effected using hydrogen. Suitable molecular weights can also be established through targeted selection of the catalyst and reaction conditions. Details in this respect are given in the above mentioned specifications.

Suitable cycloolefin for the invention are the products sold under the trademark Topas® by Ticona.

In a preferred embodiment of the invention, the barrier layer consists in a cycloolefin polymer, and more preferably in an ethylene-norbornene copolymer.

In another preferred embodiment of the invention, the olefin polymer is a high density polyethylene. Preferably, this high density polyethylene has a density greater than, or equal to, 940 kg/m$^3$, more preferably ranging from about 940 kg/m$^3$ to about 965 kg/m$^3$, measured according to ISO DIS 1183. More preferably, the first barrier layer consists in high density polyethylene.

The barrier layer has preferably a grammage ranging from about 5 g/m$^2$ to about 30 g/m$^2$, more preferably from about 10 g/m$^2$ to about 20 g/m$^2$.

The barrier layer is a barrier against moisture or water vapor. Preferably, the barrier layer has a moisture vapor transmission rate (MVTR) of less than 10 g/(m$^2$*24 h), preferably of less than 1.1 g/(m$^2$*24 h), measured according to DIN 53122 at a temperature of 23° C. and a relative humidity of 85%.

The polymeric film of the packaging of the invention also comprises a sealant layer comprising at least an amorphous polyamide. Preferably, this polyamide is the amorphous copolyamide 6-I/6-T of the following formula (I):

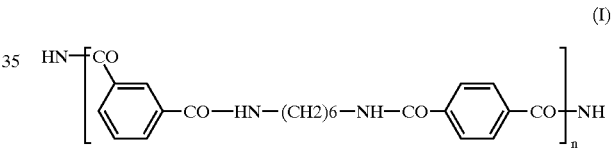

(I)

Some suitable amorphous copolyamides for use in the present invention are the amorphous nylon resins 6-I/6-T commercially available under the tradename Selar (D PA from E. I. du Pont de Nemours and Company or commercially available under the tradename Grivory® from EMS-Chemie AG.

This amorphous polyamide may be blended with an aliphatic polyamide such as polyamide 6. In a preferred embodiment of the invention, the sealant layer consists in amorphous polyamide.

The sealant layer has preferably a grammage ranging from about 3 g/m$^2$ to about 20 g/m$^2$, preferably from about 5 g/m$^2$ to about 10 g/m$^2$.

The sealant layer is in contact with the packaged product. This means that the sealant layer is directed to the product, it may touch it or not, depending on under which form the product, for instance food, is. The sealant layer also serves as a barrier against oxygen. The sealant layer shows an oxygen permeability of less that 100 cm$^3$/(m$^2$*24 h*bar), measured according to DIN 53380 at a temperature of 23.0° C. and at a relative humidity of 50%.

The polymeric film may further comprise one or more adhesive layers being situated between the substrate and the barrier layer, and/or between the barrier layer and the sealant layer.

Suitable adhesives include ethylene homopolymers, propylene homopolymers, copolymers of ethylene and a comonomer selected from vinyl acetate, methyl acrylate, butyl acrylate, ethyl acrylate or propylene, and mixtures thereof. These adhesive polymers may be maleic anhydride modified. Preferably, the adhesives have a Melt Flow Index ranging from about 3 to about 7, measured according to ASTM D1238, condition E, at 190° C. and 2.16 Kg.

In a preferred embodiment of the invention, the polymeric film comprises a first adhesive layer situated between the substrate and the barrier layer, and a second adhesive layer situated between the barrier layer and the sealant layer. Preferably, the first adhesive layer comprises an ethylene homopolymer, and more preferably a low density polyethylene. This low density polyethylene has preferably a density ranging from about 900 kg m$^3$ to about 935 kg m$^3$ measured according to ISO DIS 1183. Preferably, the second adhesive layer comprises a maleic anhydride modified polyethylene.

Suitable maleic anhydride modified polyethylenes are commercially available under the tradenames Bynel® Series 4000, Bynel® Series 4100, Bynel® Series 4200, and Bynel® Series 5000, from E.I. du Pont de Nemours and Company, Delaware, or under the tradenames "Admer NF 550" or "Admer QF 551" from Mitsui Petrochemicals, Japan.

The adhesive layer has preferably a grammage ranging from about 2 g/m$^2$ to about 10 g/m$^2$, preferably ranging from about 3 to about 5 g/m$^2$.

The packaging of the invention may comprise additional layers situated either in between two of the already mentioned layers or on the external side of the substrate layer. In an embodiment of the invention, the packaging comprises a film comprising a dispersion of a copolymer of ethylene and alkyl acrylate in water, contiguous to the external side of the substrate layer. Suitable dispersions are the products commercially available from the company Paramelt, Netherlands, under the tradename Aquaseal®.

In another embodiment of the invention, the packaging is symmetrical, the substrate layer being the core layer.

Each of the layers mentioned above may comprise the usual additives including plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, for example release agents, and/or mixtures thereof. The antioxidants may be present in an amount of about 400 to about 500 ppm in a layer.

The total grammage of the packaging of the invention ranges preferably from about 30 g/m$^2$ to about 500 g/m$^2$, and more preferably from about 300 g/m$^2$ to about 400 g/m$^2$.

Preferably, the polymeric film represents less than 10 weight percent (wt. %), and more preferably less than 5 wt. %, relative to the total weight of the packaging.

The packaging of the invention may be prepared by first preparing the polymeric film by cast film or blown film extrusion and then gluing this polymeric film to the cellulosic fibrous material substrate.

In a preferred embodiment of the invention, the packaging is prepared by coextrusion coating as follows: The polymers in pellet form are conveyed in the hopper of the extruders. The extruders melt the polymer and develop a certain pressure to force it through a die. The melt of the different polymers merge in the feed bloc or directly in the flat die. A production coextrusion coating line has usually 2 or 3 extruders, which supply polymer melts to the same die. The melt curtain leaving the die is drawn by two rolls forming the nip: a chill-roll and a rubber coated roll. The total coating grammage of polymers is typically between 15 g/m$^2$ and 50 g/m$^2$. The polymer is pressed on the substrate in the nip to develop adhesion, cooled by the chill-roll and solidified. The substrate which is wound from a roll can be flame treated, corona treated or primed before entering the nip where it is coated by the melt curtain. The typical line speed is between 100 and 300 m/min.

Through coextrusion coating, the multilayer packaging can be made in one single operation, at high speed and at low cost.

The packaging of the invention preferably shows a moisture vapor transmission rate less than, 10 g/(m$^2$*24 h), preferably less than 1.1 g/(m$^2$*24 h), measured according to DIN 53122 at a temperature of 23.0° C. and a relative humidity of 85%, and a oxygen permeability less than 100 cm$^3$/(m$^2$*24 h*bar), measured according to DIN 53380 at a temperature of 23.0° C. and a relative humidity of 500%.

The packaging of the invention also shows an excellent sealability. It is environment friendly. Thanks to its low amount of polymers, it can be recycled as plain cardboard or paper. Moreover, the packaging of the invention does not alter the taste or the odor of the packaged food.

The invention will be further described in the following Examples. In the following examples, the substrate layer is always indicated in the first place and separated from the coextruded layers by II.

EXAMPLES

Description of Ingredients

Materials used in the Examples set forth below are as follows, identified by the respective trademarks and trade designations:

Adhesive: anhydride-modified, low-density polyethylene resin, commercially available from E. I. du Pont de Nemours and Company under the tradename Bynel®) 42E703, with a melt flow index of 5.8 dg/min measured according to ASTM D1238, condition E, at 190° C. and 2.16 Kg.

Olefin 1: High Density Polyethylene, commercially available from DSM, Netherlands, under the tradename Stamylex®) 9089 F, having a Melt Flow Index (MFI) of 8 measured according to ISO 1133 at 230° C. and 2.16 Kg, having a density of 964 kg m$^3$ measured according to ISO DIS 1183.

Olefin 2: Topas® 8007D-50: copolymer of ethylene and norbornene, commercially sold by TICONA.

Polyamide: amorphous polyamide commercially available from E. I. du Pont de Nemours and Company under the tradename Selar® PA 3426.

Board: paper board, produced by Sora-Enzo in Finland, having the quality identified by supplier as that for "liquid packaging board", a width of 0.55 meters, and the grammage given in the examples.

Example 1

Samples

The following sample packaging laminates were prepared.

Sample 1: Board//Adhesive/Olefin 1/Adhesive/Polyamide with the following respective grammages in g/m$^2$: 330//3/10/3/5

Sample 2: Board//Adhesive/Olefin 1/Adhesive/Polyamide with the following respective grammages in g/m$^2$: 330//3/18/3/5

Sample 3: Board//Adhesive/Olefin 2/Adhesive/ Polyamide with the following respective grammages in g/m²: 330//3/10/3/5

Sample 4: Board//Adhesive/Olefin 2/Adhesive/ Polyamide with the following respective grammages in g/m²: 330//3/18/3/5

Sample Preparation

The samples were prepared by coextrusion coating as follows:

For each sample, the olefin polymer was introduced in extruder A (2.5 inch diameter, L/D=30), the polyamide was introduced in extruder B (3.5 inch diameter, L/D=30) and the adhesive was introduced in extruder C (2.5 inch diameter, L/D=30). For each extruder, the temperatures in °C. were set according to the following:

| Extruder A: | 180 | 220 | 260 | 280 | 280 |
| Extruder B: | 240 | 260 | 280 | 290 | 300 |
| Extruder C: | 180 | 220 | 260 | 280 | 300 |

The temperature of the adaptor, the connecting pipes, the feed-bloc and the die was set up at 300° C. The melt from extruder C was split into 2 streams and a 4-layers feed-bloc with 9 slots was installed: 3 slots connected to extruder B, 2 slots to extruder C, 2 slots to extruder A and 2 slots to extruder C. The die gap was 0.7 mm and the die width 800 mm. The air-gap was set at 15 cm. The specific force in the nip was 40 Kg/cm causing the rubber (80 Shore A) to deform over about 2 cm. The chill-roll temperature was 10° C. The board of grammage 330 g/m² was flame treated before coating. All the samples were produced at 100 m/min.

For Samples 1 to 4, the extruder speeds were set up at 10 rpm for extruder B and 43 rpm for extruder C. For Samples 1 and 3, for which the olefin layer has a grammage of 10 g/m², the extruder A was set up at 84 rpm. For Samples 2 and 4, for which the olefin layer has a grammage of 18 g/m², the extruder A was set at 220 rpm.

Tests

Seal Strength:

The board coated with polymer film is cut in 15 mm wide strips. Two strips are sealed with the polymer film on polymer film in a heat sealer manufactured by Kopp (Germany) with two metallic and heated seal jaws 25 mm wide, 200 mm long. The sealing conditions used in the Example are: 0.3 Mpa pressure applied on the seal area and 1 second. The Sealing Temperatures indicated in the example is the temperature of the seal jaws.

The seal force is measured on 15 mm wide strips in a tensile tester manufactured by Zwick (Germany) at a pulling speed of 100 mm/min. The highest force is measured.

The seal forces measured for Example 1, Sample 4, are as indicated in Table I.

TABLE I

| Sealing Temperature | 130° C. | 140° C. |
| Seal Strength | 6 N/15 mm | 17 N/15 mm |

Moisture Vapor Transmission Rate:

The moisture vapor transmission rate (MVTR) of each sample was measured according to DIN 53122: a first test was made at a temperature of 23.0° C. and a relative humidity of 85% and a second test was made at 37.8° C. and a relative humidity of 90%. Two measurements were made for each test. The average value was extracted. The results are collected in the following Table II:

TABLE II

| Sample | 1 | 2 | 3 | 4 |
|---|---|---|---|---|
| MVTR in g/m² × 24 h 23.0° C., 85% | 6.87 | 2.50 | 2.75 | 1.02 |
| MVTR in g/m² × 24 h 37.8° C., 90% | 25.1 | 9.17 | 8.48 | 3.15 |

The oxygen permeability of Sample 4 was measured according to DIN 53380 at a temperature of 23.0° C. and a relative humidity of 50%. Two measurements were made. The average measured value was 77.1 cm³/(m²*24 h*bar).

Example 2

Employing a board of grammage 420 g/m² instead of the board of grammage 330 g/m² of Example 1, Sample 1 (all other grammages being the same as indicated for Sample 1), a laminate (Sample 5) can be made using the method of Example 1. The resulting Sample 5 will comprise less than 5 wt. % of polymeric film and will have the same barrier properties as Sample 1.

What is claimed is:

1. A multilayer packaging comprising:
    a) at least one cellulosic fibrous material substrate, and
    b) at least one polymeric film, coated on the substrate of a), comprising:
        i) at least one barrier lever comprising in olefin polymer, and
        ii) at least one sealant layer comprising an amorphous polyamide, the sealant lever being in contact with the packaged product, and wherein the olefin polymer is a cycloolefin polymer.

2. The packaging of claim 1, wherein the barrier layer has a moisture vapor transmission rate (MVTR) of less than 10 g/(m²*24 h), measured according to DIN 53122 at a temperature of 23° C. and a relative humidity of 85%.

3. The packaging of claim 1, wherein the sealant layer shows an oxygen permeability of less than 100 cm³ (m²*24 h*bar), measured according to DIN 53380 at a temperature of 23.0° C. and at a relative humidity of 50%.

4. The packaging of claim 1, wherein the polymeric film further comprises a first adhesive layer situated between the substrate and the barrier layer, and a second adhesive layer situated between the barrier layer and the sealant layer.

5. The packaging of claim 4, wherein the first adhesive layer comprises a low density polyethylene.

6. The packaging of claim 4, wherein the second adhesive layer comprises a maleic anhydride modified polyethylene.

7. The packaging of claim 1, wherein the polymeric film represents less than 10 wt. %, and more preferably less than 5 wt. %, relative to the total weight of the packaging.

8. A multilayer packaging comprising:
    c) at least one cellulosic fibrous material substrate, and
    d) at least one polymeric film, coated on the substrate of a), comprising:
        i) at least one barrier layer comprising an olefin polymer, and
        ii) at least one sealant layer comprising an amorphous polyamide, the sealant layer being in contact with the packaged product, and wherein the olefin polymer is a high density polyethylene having a density greater than, or equal to 940 kg/m³, measured according to ISO DIS 1183.

9. The packaging of claim 8, wherein the barrier layer has a moisture vapor transmission rate (MVTR) of less than 10 g/(m²*24 h), measured according to DIN 53122 at a temperature of 23° C. and a relative humidity of 85%.

10. The packaging of claim 8, wherein the sealant layer shows an oxygen permeability of less than 100 cm³/(m²*24 h*bar), measured according to DIN 53360 at a temperature of 23.0° C. and at a relative humidity of 50%.

11. The packaging of claim 8, wherein the polymeric film further comprises a first adhesive layer situated between the substrate and the barrier layer, and a second adhesive layer situated between the barrier layer and the sealant layer.

12. The packaging of claim 11, wherein the first adhesive layer comprises a low density polyethylene.

13. The packaging of claim 11, wherein the second adhesive layer comprises a maleic anhydride modified polyethylene.

14. The packaging of claim 8, wherein the polymeric film represents lees than 10 wt. %, and more preferably less than 5 wt. %, relative to the total weight of the packaging.

* * * * *

UNITED STATES PATENT AND TRADEMARK OFFICE
CERTIFICATE OF CORRECTION

PATENT NO.     : 6,811,844 B2
DATED          : November 2, 2004
INVENTOR(S)    : Trouilhet Yves M.

It is certified that error appears in the above-identified patent and that said Letters Patent is hereby corrected as shown below:

Column 8,
Line 29, delete "lever", replace with -- layer --; delete "in", replace with -- an --.

Column 9,
Line 5, delete "53360", replace with -- 53380 --.

Column 10,
Line 7, delete "lees", replace with -- less --.

Signed and Sealed this

Twenty-second Day of November, 2005

JON W. DUDAS
*Director of the United States Patent and Trademark Office*